United States Patent
Puigmarti-Luis et al.

(10) Patent No.: US 12,209,103 B2
(45) Date of Patent: Jan. 28, 2025

(54) NANOREACTORS FOR THE SYNTHESIS OF POROUS CRYSTALLINE MATERIALS

(71) Applicant: UNIVERSIDAD AUTÓNOMA DE MADRID, Madrid (ES)

(72) Inventors: Josep Puigmarti-Luis, Mellingen (CH); Felix Juan Zamora Abanades, Madrid (ES); Carlos Franco Pujante, Zurich (CH); David Rodriguez San Miguel, Madrid (ES); Alessandro Sorrenti, Zurich (CH)

(73) Assignee: UNIVERSIDAD AUTONOMA DE MADRID, Madrid (ES)

( * ) Notice: Subject to any disclaimer, the term of this patent is extended or adjusted under 35 U.S.C. 154(b) by 993 days.

(21) Appl. No.: 17/255,121

(22) PCT Filed: Jun. 21, 2019

(86) PCT No.: PCT/EP2019/066526
§ 371 (c)(1),
(2) Date: Dec. 22, 2020

(87) PCT Pub. No.: WO2019/243602
PCT Pub. Date: Dec. 26, 2019

(65) Prior Publication Data
US 2021/0246148 A1    Aug. 12, 2021

(30) Foreign Application Priority Data
Jun. 22, 2018   (EP) .................................. 18179325

(51) Int. Cl.
| | |
|---|---|
| *C07F 1/08* | (2006.01) |
| *B01J 35/12* | (2006.01) |
| *B01J 35/27* | (2024.01) |
| *B33Y 70/00* | (2020.01) |
| *C01B 37/00* | (2006.01) |
| *C09D 11/02* | (2014.01) |
| *B82Y 30/00* | (2011.01) |
| *B82Y 40/00* | (2011.01) |

(52) U.S. Cl.
CPC ............... *C07F 1/08* (2013.01); *B01J 35/27* (2024.01); *B33Y 70/00* (2014.12); *C01B 37/00* (2013.01); *C09D 11/02* (2013.01); *B82Y 30/00* (2013.01); *B82Y 40/00* (2013.01); *C01P 2004/03* (2013.01); *C01P 2004/20* (2013.01); *C01P 2004/64* (2013.01)

(58) Field of Classification Search
CPC ........ C07F 1/08; B01J 35/27; B01J 20/28016; B01J 20/3085; B01J 20/226; B33Y 70/00; C01B 37/00; C09D 11/02; B82Y 30/00; B82Y 40/00; C01P 2004/03; C01P 2004/20; C01P 2004/64; C02F 2101/20; C02F 2103/14; C02F 1/288; C02F 1/281; C02F 1/285; C02F 2103/343
See application file for complete search history.

(56) References Cited

FOREIGN PATENT DOCUMENTS

| | | |
|---|---|---|
| EP | 3006103 A1 | 4/2016 |
| JP | 2016178005 A * | 10/2016 |
| JP | 2018118929 A | 8/2018 |
| WO | 0181487 A1 | 11/2001 |
| WO | 2006019988 A1 | 2/2006 |
| WO | 2017052474 A1 | 3/2017 |

OTHER PUBLICATIONS

Cao et al. "A surfactant template-assisted strategy for synthesis of ZIF-8 hollow nanospheres" Materials Letters, 2015, 161, 682-685 (Year: 2015).*
Cui et al. "Mechanism of the Mixed Surfactant Micelle Formation" J. Phys. Chem. B. 2010, 114, 7808-7816 (Year: 2010).*
Danaei et al. "Impact of Particle Size and Polydispersity Index on the Clinical Application of Lipidic Nanocarrier Systems" Pharmaceuticals, 2018, 10, 1-17. (Year: 2018).*
Dey et al. "Fluorometric sensing of Triton X-100 based organized media in water by a MOF" Journal of Luminescence 2016, 172, 1-6. (Year: 2016).*
Fan et al. "Highly Porous ZIF-8 Nanocrystals Prepared by a Surfactant Mediated Method in Aqueous Solution with Enhanced Adsorption Kinetics" ACS Applied Materials & Interfaces 2014, 6, 14994-1499 (Year: 2014).*
Millipore Sigma "Tween 80", 2024, https://www.sigmaaldrich.com/US/en/product/sial/p1754 (accessed Mar. 12, 2024). (Year: 2024).*
Pan et al. "Tuning the crystal morphology and size of zeolitic imidazolate framework-8 in aqueous solution by surfactants" CrystEngComm 2011, 13, 6937-6940 (Year: 2011).*
Lestari "Hydrothermal Synthesis of Zeolitic Imidazolate Frameworks-8 (ZIF-8) Crystals with Controllable Size and Morphology" "Master of Science Thesis", King Abdullah University of Science and Technology, May 2012, p. 1-64. (Year: 2012).*
Huang et al. "Covalent organic frameworks: A materials platform for structural and functional designs" Nature Reviews Materials 2016, article No. 16068, p. 1-19 (Year: 2016).*
Dey, B., et al., "Fluorometric sensing of Triton X-100 based organized media in water by a MOF", "Journal of Luminescence", 2016, pp. 1-6, vol. 172, Publisher: Elsevier.

(Continued)

*Primary Examiner* — Sarah Alawadi
*Assistant Examiner* — Judith Marie Kamm
(74) *Attorney, Agent, or Firm* — HULTQUIST, PLLC; Steven J. Hultquist (57) ABSTRACT

The present invention relates to the field porous crystalline materials, more particularly to metal organic frameworks (MOFs) and covalent organic frameworks (COFs). According to this invention, micelles are used as nanoreactors for the synthesis and stabilisation of porous crystalline materials in aqueous dispersions. Disclosed are dispersions comprising such porous crystalline materials, the synthesis and use of such dispersions. Further disclosed are novel porous crystalline materials, the synthesis and use of such crystalline materials. Further disclosed are novel inks comprising the dispersions and non-solvent, the synthesis and use of such inks for direct printing, 2D printing and 3D printing.

7 Claims, 2 Drawing Sheets

(56) References Cited

OTHER PUBLICATIONS

Hmadeh, M., et al., "New Porous Crystals of Extended Metal-Catecholates", "Chemistry of Materials", 2012, pp. 3511-3513, vol. 24, Publisher: ACS Publications.

Huang, Z., et al., "Performance of metal-organic framework MIL-101 after surfactant modification in the extraction of endocrine disrupting chemicals from environmental water samples", "Talanta", 2015, pp. 366-373, vol. 143, Publisher: Elsevier.

Lestari, G., "Hydrothermal Synthesis of Zeolitic Imidazolate Frameworks-8 (ZIF-8) Crystals with Controllable Size and Morphology", "Master of Science Thesis", May 2012, pp. 1-64, Publisher: King Abdullah University of Science and Technology.

Mellah, A., et al., "Adsorption of Pharmaceutical Pollutants from Water Using Covalnt Organic Frameworks", "Chem. Eur. J.", 2018, pp. 10601-10605, vol. 24, Publisher: Wiley-VCH Verlag GmbH & Co.

Nazar, M., et al., "Physicochemical investigation of antibacterial Moxiflosacin interacting with quaternary ammonium disinfectants", "Fluid Phase Equilibria", 2015, pp. 47-54, vol. 406, Publisher: Elsevier.

Pan, Y., et al., "Tuning the Crystal Morphology and Size of Zeolithic Imidazolate Framework-8—in Aqueous Solution by Surfactants", "Cryst. Eng. Commun.", 2011, pp. S1-S4, vol. 13, Publisher: The Royal Society of Chemistry.

Peng, L., et al., "Surfactant-directed assembly of mesoporous metal-organic framework nanoplates in ionic liquids", "Chem. Commun", 2012, pp. 8688-8690, vol. 48, Publisher: The Royal Society of Chemistry.

Peng, Y., et al., "A versatile MOF-based trap for heavy metal ion capture and dispersion", "Nature Commun.", 2018, pp. 1-9, vol. 9, No. 187.

Sun, L-B., et al., "Cooperative Template-Directed Assembly of Mesoporous Metal-Organic Frameworks", "Journal of the American Chemical Society", 2012, pp. 126-129, vol. 134, Publisher: ACS Publications.

Vyas, V., et al., "A tunable azine covalent organic framework platform for visible light-induced hydrogen generation", "Nature Commun.", 2015, pp. 1-9, vol. 6, Publisher: Macmillan Publishers Limited.

Wu, Y-P., et al., "Surfactant-Assisted Phase-Selective Synthesis of New Cobalt MOFs and Their Efficient Electrocatalytic Hydrogen Evolution Reaction", "Angew. Chem. Int. Ed.", 2017, pp. 13001-13005, vol. 56, Publisher: Wiley Online Library.

Xin, C., et al., "A surfactant template-assisted strategy for synthesis of ZIF-8 hollow nanospheres", "Material Letters", 2015, pp. 682-685, vol. 161, Publisher: Elsevier.

\* cited by examiner

NANOREACTORS FOR THE SYNTHESIS OF POROUS CRYSTALLINE MATERIALS

CROSS-REFERENCE TO RELATED APPLICATIONS

This is a U.S. national phase under the provisions of 35 U.S.C. § 371 of International Patent Application No. PCT/EP2019/066526 filed Jun. 21, 2019, which in turn claims priority under the provisions of 35 U.S.C. § 119 of European Patent Application No. 18179325.8 filed Jun. 22, 2018. The disclosures of such international patent application and European priority patent application are hereby incorporated herein by reference in their respective entireties, for all purposes.

The present invention relates to the field porous crystalline materials (PCMs), more particularly to metal organic frameworks (MOFs) and covalent organic frameworks (COFs). According to this invention, micelles are used as nanoreactors for the synthesis and stabilisation of porous crystalline materials in aqueous dispersions. Disclosed are dispersions comprising such porous crystalline materials, the synthesis and use of such dispersions. Further disclosed are novel porous crystalline materials, the synthesis and use of such crystalline materials. Further disclosed are novel inks comprising the dispersions and non-solvent, the synthesis and use of such inks for direct printing, 2D printing and 3D printing.

MOFs and COFs are well-known classes of materials and described e.g. in Stock et al (Chem. Rev. 2012, 112, 933-969 and Acc. Chem. Res. 2015, 48, 3053-3063).

James et al (Chem. Eur. J. 2007, 13, 3020-3025) describes the concept of porous liquids; this document is devoid of any specific teachings. James et al (Nature 2015, 527, 216-221) further elaborates this concept. According to this document, cage molecules are designed that provide a well-defined pore space and that are highly soluble in solvents whose molecules are too large to enter the pores. Due to this size-limitation, water is not a suitable solvent.

Ranocchiari et al (EP3006103) describe a method for producing MOFs and COFs in a continuous flow reactor using microwave irradiation. Harsh reaction conditions limit the choice of available MOFs and COFs, the specific set-up used limits its versatility. All experiments were run in organic solvents, the use of $H_2O$/EtOH is considered a disadvantage, as there was no product observable [0038].

G. Lestari (Hydrothermal Syntesis of ZIF-8 crystals with controllable size and morphology; PhD Thesis) and Yichang Pan, Lestari et al (Cryst. Eng. Comm. 2011, 13, 6937) describe the synthesis of ZIF-8 crystals from aqueous solutions with low amounts of surfactants. As specifically stated, the authors chose "the amount of CTAB added to the synthesis solution is below the CMC in all situations". Further, the authors consider their manufacturing method as a potential "route for preparation of big particles out of organic solvent."

Y. Peng et al (Nature Communications 2018, 9, 187) describe a versatile MOF-based trap for heavy metal ion capture and dispersion. In the experiments disclosed, MOF is used as a bulk material; the approach of using specific MOFs is closely related to the concept of activated carbon adsorbent. The authors consider the materials disclosed as a versatile heavy metal ion trap for separation and catalysis. The document fails in disclosing any colloidal dispersion comprising MOFs.

A. Mellah et al (Chem. Eur. J. 2018, 24, 10601) describe the capture of pharmaceutical pollutants from water using specific COFs. According to this document, COFs are prepared and dispersed in water. As evidenced by SEM measurements (figs. SI5 and SI12) the COFs are approximately 5 microns and thus too large for forming a colloidal dispersion.

V. Vyas et al (Nature Communications 2015, 6, 8508) describe a tuneable azine COF platform for hydrogen generation. Again, the COFs are prepared and dispersed in water (p. 8). As evidenced by SEM measurements (fig. SI60) the COFs are approximately 10 microns and thus too large for forming a colloidal dispersion.

In consequence, there is a need for improved methods to obtain MOFs and COFs. Particularly, there is a need for manufacturing methods, meeting one or more of the following requirements: faster, non-hazardous conditions, reduced number of manufacturing steps, user-friendly, monodispersity nanosize material production, and scalable.

Also, there is an ever-existing need in providing new and useful materials, such as new MOFs and COFs.

These objectives are achieved by providing dispersions and manufacturing methods thereof as defined in the ensuing claims. Further aspects of the invention are disclosed in the ensuing specification and claims. Broadly speaking, the invention provides for a new platform to synthesize porous crystalline materials (PCMs, including known MOFs and COFs and novel MOFs and COFs with new combinations of building blocks or directly with new building blocks). The platform offers the possibility to synthesize PCMs in water, in form of stable dispersion. The platform also offers the possibility to access to new nano-particles, showing morphologies until now non-accessible. Accordingly, the invention relates

- in a first aspect to aqueous dispersions of porous crystalline materials and inks;
- in a second aspect to methods for manufacturing such dispersions and inks;
- in a third aspect to the use of and methods of using such dispersions;
- in a forth aspect to methods of manufacturing PCMs, specifically MOFs and COFs;
- in a fifth aspect to new PCMs, specifically in the form of MOFs and COFs.

The present invention will be described in more detail below. It is understood that the various embodiments, preferences and ranges as disclosed herein may be combined at will. Further, depending of the specific embodiment, selected definitions, embodiments or ranges may not apply.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

Porous crystalline materials (PCM): The term "porous crystalline material" is chosen to cover both, metal-organic frameworks (MOF) and covalent organic frameworks (COF) as defined herein. Such materials comprise a first building block and a second building block, different from the first. They are crystalline in that they show a long-range order (e.g. as shown by X-ray diffraction). Further, they are porous in that they comprise cavities in the size of 0.1-7 nm (e.g. as shown by absorption of small molecules).

Metal-organic frameworks (MOFs): The term "MOF" is known in the field and denotes chemical entities comprising cores of metal ions (including clusters) and ligands (also termed "struts"). The ligands have at least two coordination sites. In the context of this invention MOFs do form a 2D or 3D network with open pores.

Covalent-organic frameworks (COFs): The term "COF" is known in the field and denotes analogues to MOFs where the metal ion is replaced by an organic analogue linker. As discussed herein, COFs do form a 2D or 3D network with open pores.

Aqueous Dispersions: The term "aqueous dispersion" is known in the field and denotes a two-phased system comprising of 10-1000 nm particles that are uniformly distributed throughout a continuous aqueous phase, particularly water.

Micellar Solutions: The term "micellar solution" is known in the field and particularly denotes a liquid composition that is thermodynamically stable, transparent and homogeneous. In micellar solutions, the dissolved entity (ions or molecules) is coordinated by surfactants. It thus distinguishes from true solutions where the dissolved entity is coordinated by solvent molecules. It further distinguishes from emulsions which are not thermodynamically stable and are generally opaque. It also distinguishes from dispersions, which are not homogeneous.

The present invention will be better understood by reference to the figures.

Covalent Organic Frameworks (COFs) and Metal Organic Frameworks (MOFs), collectively Porous Crystalline Materials (PCMs), are versatile materials with promising applications. Nevertheless, the use of harsh and hazardous synthetic conditions as well as their insolubility and the poor control over particle size limit their use. The present invention provides for a new one-pot manufacturing method for preparing stable aqueous colloidal dispersions (monodisperse in size), particularly of sub-20 nm crystalline COFs, relying on a bioinspired approach for controlling their growth. This procedure allows to downsize these PCMs beyond the previously reported limits. The present invention further allows to process PCMs, particularly said sub-20 nm crystalline COFs, into micro- and millimeter sized structures, such as freestanding films and 3D-shapes. This is achieved by controlling the particle aggregation of the colloids.

(A) Schematic representation of the synthesis of COF colloidal solutions in water as described herein;
(B) Photograph of the RT-COF-1 water colloid solution, highlighting its transparency;
(C) Photograph of a transparent RT-COF-1 colloidal solution (left) showing Tyndall effect upon laser irradiation (right).

(A) Schematic illustration of the setup used for creating RT-COF-1 films.
(B and C) SEM images of films obtained with the setup in A, respectively showing the cross-section of a freestanding film and the uniform surface of a millimeter-sized film. Inset: SEM at high magnification showing the nanoparticulated texture of the obtained film.
(D) Photograph of the microfluidic chip used to achieve the direct printing of RT-COF-1 nanoparticles. Left Inlet for micellar dispersion as described herein (e.g. RT-COF-1); Top-inlet for non-solvent (e.g. EtOH); right outlet for inventive ink.
(E and F) Photograph showing the writing on a glass surface of the letters "COF" and "ETH" with RT-COF-1 nanoparticles.

In more general terms, in a first aspect, the invention relates to aqueous dispersions of porous crystalline materials (PCMs) and to inks comprising PCMs. This aspect of the invention shall be explained in further detail below:

Accordingly, the invention provides for a dispersion comprising a continuous phase and micelles dispersed therein; said continuous phase comprising water and optionally one or more additives, said micelles comprising porous crystalline materials (PCMs) selected from MOF and COF and surfactants.

Dispersion: The micellar dispersion contains (ie. comprises or consists of) PCMs, aqueous medium, and surfactant, optionally co-surfactant(s) and optionally additive(s). Further, starting materials ("building blocks") may remain within the dispersion as well.

In an advantageous embodiment, said dispersion is a colloidal dispersion, preferably with micellar size between 10-1000 nm, such as 15-200 nm, particularly preferably 15-60 nm.

In an advantageous embodiment, said micelles are monodisperse in size. Monodisperse in the context of this invention relates to the micelles having a narrow size distribution with a polydispersity index (PDI) between 0-0.7, preferably between 0.05 and 0.5 and may be determined according to dynamic light scattering (DLS) measurements. The ratio dispersed phase (micelles):continuous phase may vary over a broad range, typically is in the range 1:99 12:88 (w/w), preferably 5:95 (w/w). Accordingly, the micellar dispersion contains at least about 90 percent aqueous medium.

In exemplary embodiments, a dispersion of this invention may contain about 0.01-4 wt % PCMs, about 80-99 wt % water, about 0.01-4 wt % surfactant, about 0.01-4 wt % co-surfactant and about 0.001-10 wt % additive.

Continuous phase: In an advantageous embodiment, the continuous phase of said dispersion comprises at least 90 wt % water, such as 95 wt % water. In an advantageous embodiment, the continuous phase of the colloidal dispersion is free of organic solvents (non-solvents, as defined below). In this embodiment, the continuous phase either consists of water or consists of water and additives (as defined below).

Micelles: The micelles contain one or more PCMs surrounded by surfactants. The ratio PCMs:surfactants phase may vary over a broad range, typically is in the range 1:100-2:1 (w/w), preferably 4:63 (w/w).

Surfactant: Suitable surfactants are known and depend on the reaction starting materials chosen. In an advantageous embodiment, said surfactants are selected from the group consisting of cationic surfactants, anionic surfactants and non-ionic surfactants.

Advantageously, the amount of surfactant is chosen to be above its critical micellar concentration. The CMC is a known parameter specific to each surfactant.

Additives: Suitable additives are known and depend on the reaction conditions for obtaining COFs and MOFs. Such additives may be selected to adjust the pH (acids, bases, buffer systems) or to adjust the ionic strength (e.g. electrolytes), or to adjust the viscosity or to improve reaction rate (e.g. catalysts).

Non-solvent: The dispersion may further comprise non-solvents. Suitable non-solvents are miscible with water and present in the continuous phase. Such dispersions retain the colloidal structure of the above dispersions but possess an increased viscosity compared to the above dispersions and are thus termed "ink". Suitable non-solvents selected from the group of organic solvents miscible with water and having a dielectric constant in the range of 2-50, preferably 10-35. Exemplary non-solvents include C1-C4 alcohols, C1-C4 aldehydes, C3-C5 ketones, C1-C6 carboxylic acids, C1-C6 carboxylic acid C1-C2 esters, C1-C2 nitriles, and THF.

Ink: As the term implies, an ink is a colloidal dispersion adapted for printing, such as ink-jet printing or 3D printing. In an embodiment, the invention provides an ink comprising a continuous phase and micelles dispersed therein, characterized in that (i) said continuous phase comprising water, one or more non-solvents and optionally one or more further additives each as defined herein; (ii) said micelles comprising surfactants and (PCMs) as described herein; (iii) said micelles are of a size as described herein; and (iv) the concentration of said surfactants in said dispersion is above the CMC.

In an advantageous embodiment the ink comprises a non-solvent selected from the group consisting of C1-C4 alcohols, $C_{1-4}$ aldehydes, $C_{3-5}$ ketones, $C_{1-6}$ carboxylic acids, $C_{1-6}$ carboxylic acid $C_{1-2}$ esters, $C_{1-2}$ nitriles, and THF.

In an advantageous embodiment the ink has a viscosity in the range of $1-10^6$ cP, preferably $10^2-10^5$ cP;

In an advantageous embodiment the ink is adapted to direct printing, 2D printing or 3D printing, particularly 3D printing.

Porous Crystalline Material: The term PCM is defined above; from a manufacturing perspective, they comprise a first and a second building block. Advantageous PCMs are identified below.

In an advantageous embodiment, the invention relates to COFs from the class of imines. Such COFs are obtainable by condensation-reactions of polyamines with polyaldehydes, depending on the building blocks, 2D-COFs and 3D-COFs are available.

In an advantageous embodiment, the invention relates to MOFs from the class of Catechols. Such MOFs are obtainable by the coordination of polyphenols with copper (II), typically resulting in 2D-MOFs.

In an advantageous embodiment, the invention relates to TCPP-Cu MOF. Particularly advantageously, the invention relates to TCPP-Cu MOF free of metal in the porphyrin core. Such TCCP-Cu MOFs are obtainable by reaction of Tetrakis (4-carboxyphenyl)porphyrin with cooper (II) species, resulting in 2D-MOFs.

In an advantageous embodiment, the invention relates to MOFs from the class of ZIF-8. Such MOFs are obtainable by the reaction of 2-methyl imidazole with a salt of zinc (II), resulting in the formation of 3D-MOFs.

In an advantageous embodiment, the invention relates to MOFs from the class of MIL 100, such as MIL 100(Fe). Such MOFs are obtainable by reacting trimesic acid with an iron (III) species; resulting in the formation of 3D-MOFs.

In a second aspect, the invention relates to methods for manufacturing aqueous colloidal dispersions of PCMs as described herein (first aspect). This aspect of the invention shall be explained in further detail below:

In one embodiment invention provides for a method for manufacturing a dispersion as described herein, first aspect of the invention. Said method comprises the steps of providing a micellar solution (a) and a micellar solution (b), whereby micellar solution (a) comprises a first building block of said porous crystalline material, water, a first surfactant and optionally additives, micellar solution (b) comprises a second building block of said porous crystalline material, water, a second surfactant and optionally additives ("step i") combining said micellar solutions (a) and (b), thereby obtaining said dispersion ("step ii").

In one further embodiment, the invention provides for a new approach to synthesize stable aqueous colloidal dispersions of sub-20 nm COF particles at room temperature. Compared to the known methods for manufacturing PCMs, the inventive method is extremely simple. As discussed herein and supported by the examples, micelles are used as nanoreactors for the synthesis and stabilisation of PCMs in aqueous dispersions.

Solution (a): This solution contains (i.e. comprises or consist of water, one or more surfactants, a first building block of PCMs and optionally additives. The components water, surfactants, additives are discussed above in the context of the first aspect of the invention.

The solution (a) is considered a micellar solution, as the first building block typically has a low water solubility; the surfactant present will aid in forming a micelle of first building block present in the aqueous phase. The amount of the individual components may vary over a broad range. Typically, the amount of water is in the range of 90-95 wt %. Typically, the amount of surfactant is in the range of 0.04-4 wt %. Typically, the amount of first building block is in the range of 0.01-1 wt. %. Typically, the amount of additive is in the range of 0-10 wt %.

Solution (b): This solution contains (i.e. comprises or consist of water, one or more surfactants, a second building block of PCMs and optionally additives. The components water, surfactants, additives are discussed above in the context of the first aspect of the invention. The solution (b) is considered a micellar solution, as the second building block typically has a low water solubility; the surfactant present will aid in forming a micelle of second building block present in the aqueous phase. The amount of the individual components may vary over a broad range. Typically, the amount of water is in the range of 90-95 wt %. Typically, the amount of surfactant is in the range of 0.04-4 wt %. Typically, the amount of second building block is in the range of 0.01-1 wt %. Typically, the amount of additive is in the range of 0-10 wt %.

Surfactants: A broad range of surfactants may be used, the term is discussed above, first aspect of the invention. Surfactants are considered important in the synthesis of functional crystalline materials and metal nanoparticles as they control the growth of nanocrystals tuning their size and shape via a selective attachment to growing crystal faces. Further, surfactants can generate supramolecular assemblies in water (e.g. micelles) whose shape and size can be finely controlled with both temperature and surfactant concentration. So far, however, micelles are not used as nanoreactors for the synthesis and stabilization of PCMs in water. The strong polarity gradient present between the hydrophilic surface and the hydrophobic core of a micelle enables that both polar and nonpolar reagents can be solubilized in water.

Accordingly, in micellar media is possible to solubilize a broad number of building blocks which react under mild conditions via merging the precursor micellar solutions. Herein, it is described how this approach can efficiently be used to obtain dispersions of PCMs in water; a result that circumvents a major drawback and challenge in porous crystalline materials field.

First/second building block for MOFs: MOFs are typically formed by reacting a first building block (also termed inorganic unit, e.g. according to formula (I)), with a second building block (also termed organic linker; e.g. according to formula (II)).

Suitable first building blocks (inorganic units) are of formula (I)

$$M_xL_z \quad (I)$$

where
M represents a metal or semi-metal; preferably transition metals in oxidation states II, III or IV, such as Cu(II), Fe(III), Al(III), Cr(III), Co(II); or Zn(II);
L represents a residue of type Hal, O, OH, CO, N, NO, preferably Halogen, Hydroxy, Carboxy, nitro, amine;
w ≥1; and ≥0.

Suitable second building blocks (linkers) for MOF synthesis are known. In principle, any known ligand or any combinations of ligands suitable for a particular metal may be used for this step. Suitable linkers are of formula (II)

$$R_xD_y \quad (II)$$

where
R represents an organic group of formula $$C_mH_oA \quad (II-1)$$

where
A represents H or a functionalization of type amino, amido, cyano, nitro, aldehyde, urea, thiourea, ester, carbonate, alcohol, ether, halogen, phosphine derivative, phosphine oxide derivative, imidazolium, pyridino, triazole, imidazole, phosphate, phosphoric acid;
D represents a donor group, which binds to the inorganic unit such as carboxylic acid, sulfonic acid, carboxylate, sulfonate, carbonyl, hydroxyl, hydroxylate, amino, ammonium, phosphine, phosphonium, pyridine and derivatives, imidazole and derivatives, phosphonate and derivatives, nitrile;
x≥1; y≤1, advantageously 2 or 1; m≤1; o represents 2m, or 2m−2.

Advantageously, ligands of formula (II) are selected from the group consisting of benzimidazole, 2-methyl imidazole, purine, 5-azabenz-imidazole, 4-azabenzimidazole, 5-chlorobenz-imidazole, imidazolate-2-carboxyaldehyde, 4-methyl-5-imidazole-carboxaldehyde, terephthalic acid, 1,3,5-benzene-tricarboxylic acid, muconic acid, benzene-1,3,5-tricarboxylic acid and combinations thereof.

Suitable combinations of metal and ligand are indicated below:

| MOF | Metal Center | Ligand (II) |
|---|---|---|
| ZIF-7 | Zn | benzimidazole |
| ZIF-8 | Zn | 2-methyl imidazole |
| ZIF-20 | Zn | purine |
| ZIF-21 | Cc | purine |
| ZIF-22 | Zr | 5-azabenzimidazole |
| ZIF-23 | Zn | 4-azabenzimidazole |
| ZIF-67 | Co | 2-methyl imidazole |
| ZIF-69 | Zn | 5-chlorobenzimidazole |
| ZIF-90 | Zn | imidazole-2-carboxyaldehyde |
| SIM-1 | Zn | 4-methyl-5-imidazolecarboxaldehyde |
| MIL-47 | V | terephthalic acid |
| MIL-53 | Al/Cr/Fe | 1,4-benzenedicarboxylic acid |
| MOF-5 | Zn | 1,4-benzenedicarboxylic acid |
| MIL-96 | Al | 1,3,5-benzenetricarboxylic acid |
| MIL-89 | Fe | muconic acid |
| MIL-101 | Cr | terephthalic acid |
| HKUST-1 | Cu | benzene-1,3,5-tricarboxylic acid |

Accordingly, in an advantageous embodiment, the MOFs are selected from the group consisting of ZIF-7, ZIF-8, ZIF-20, ZIF-21, ZIF-22, ZIF-23, ZIF-67, ZIF-69, ZIF-90, SIM-1, MIL-47, MIL-53, MOF-5, MIL-96, MIL-89, MIL-101, and HKUST-1; preferably ZIF-8.

First/second building block for COFs: COFs are formed by reacting a first building block, also termed reagent 1 (suitable to give a covalent bond according to formula (III)), with a second building block, also termed reagent 2 (suitable to give a covalent bond e.g. according to formula (IV)).

Suitable first building blocks are of formula (III)

$$R_xA_n \quad (III)$$

where
n ≥2; ≥2;
A represents an amine, hydrazine, nitrile;
R represents a group selected from substituted and un-substituted alkyl, substituted and substituted and un-substituted aryl un-substituted alkyl aryl and macrocyclics groups.

Suitable second building blocks are of formula (IV)

$$R_xB_n \quad (IV)$$

where
n ≥2; x ≥2;
B represents an aldehyde, catechol, ketone;
R represents a group as defined above, formula (III).

Suitable combinations of building block 1 (according to formula (III) and building block 2 (according to formula (IV) are indicated below:

| COF | Building Block 1 | Building Block 2 |
|---|---|---|
| TpPa-1 | p-phenylenediamine | 1,3,5-triformylphloroglucinol |
| Tp-Azo COF | 4,4'-azodianiline | 1,3,5-triformylphloroglucinol |
| CTV-COF-1 | Aniline | Cyclotriveratrylene |
| TpBDH COF | pyromellitic-N,N'-bisaminoimide | 1,3,5-triformylphloroglucinol |
| COF-LZU-8 | Aniline | 1,3,5-Benzenetricarboxaldehyde |
| TpPa-Py | 2,5-diaminopyridine | 1,3,5-triformylphloroglucinol |
| Py-An COF | 2,6-diaminoanthracene | 1,3,6,8-tetrakis(p-formylphenyl)pyrene |
| DhaTph COF | 5,10,15,20-tetrakis(4-aminophenyl)-21H, 23H-porphine | 2,5-dihydroxy-terephthalaldehyde |
| CS-COF | tert-butylpyrene tetraone | triphenylene hexamine |
| PI-COF-2 | 1,3,5-tris(4-aminophenyl)benzene | pyromellitic dianhydride |

-continued

| COF | Building Block 1 | Building Block 2 |
|---|---|---|
| PI-COF-3 | 1,3,5-tris[4-amino(1,1-biphenyl-4-yl)]benzene | pyromellitic dianhydride |
| TFPT-COF | 2,5-diethoxy-terephthalohydrazide | 1,3,5-tris-(4-formyl-phenyl)triazine |
| ACOF-1 | Hydrazine | 1,3,5-Benzenetricarboxaldehyde |
| COF-JLU2 | Hydrazine | 1,3,5-triformylphloroglucinol |
| $N_3$-COFs | Hydrazine | 4,4',4''-(1,3,5-Triazine-2,4,6-triyl)tris[benzaldehyde] |
| Py-Azine COF | Hydrazine | 1,3,6,8-tetrakis(4-formylphenyl)pyrene |

Process steps (i) and (ii): These process steps are entirely conventional, but not yet applied in the context of manufacturing PCMs. Depending on the specific implementation of the manufacturing, steps (i) and (ii) may be implemented as batch-wise, semi-continuous or continuous process steps.

In one embodiment, step (ii) may take place at temperatures between 10-100° C., preferably room temperature (including the range of approx. 20-30° C.).

In one embodiment, step (ii) may take place for 0.1-20 hrs.

In one embodiment, step (ii) may take place at atmospheric pressure (including the range of approx. 0.9-1.1 bar).

In one embodiment, step (ii) is effected by providing micellar solution (a) first and adding micellar solution (b) afterwards.

Figure 1:
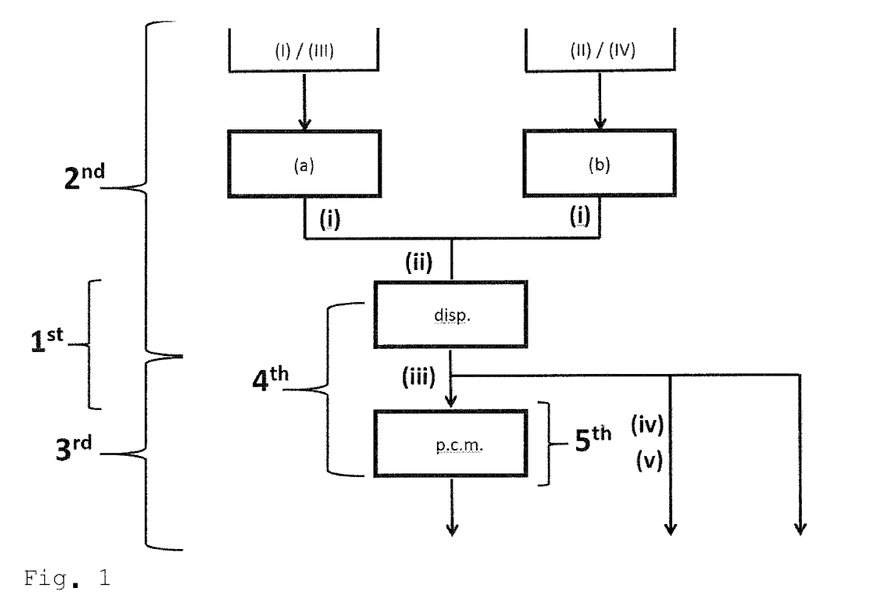
FIGS. 1 and 2 outline the invention as described herein. The following abbreviations are used:
p.c.m.—Porous crystalline material as defined herein
disp.—colloidal dispersion as described herein, $1^{st}$ aspect
ink—inks as described herein, $1^{st}$ aspect;
(a) and (b)—micellar solutions as described herein;
(c)—non solvent as described herein
(I) . . . (IV) building blocks as described herein;
(i) . . . (ix) process steps as described herein;
$1^{st}$ . . . $5^{th}$ allocation to the aspects of this invention.
Figure 2:
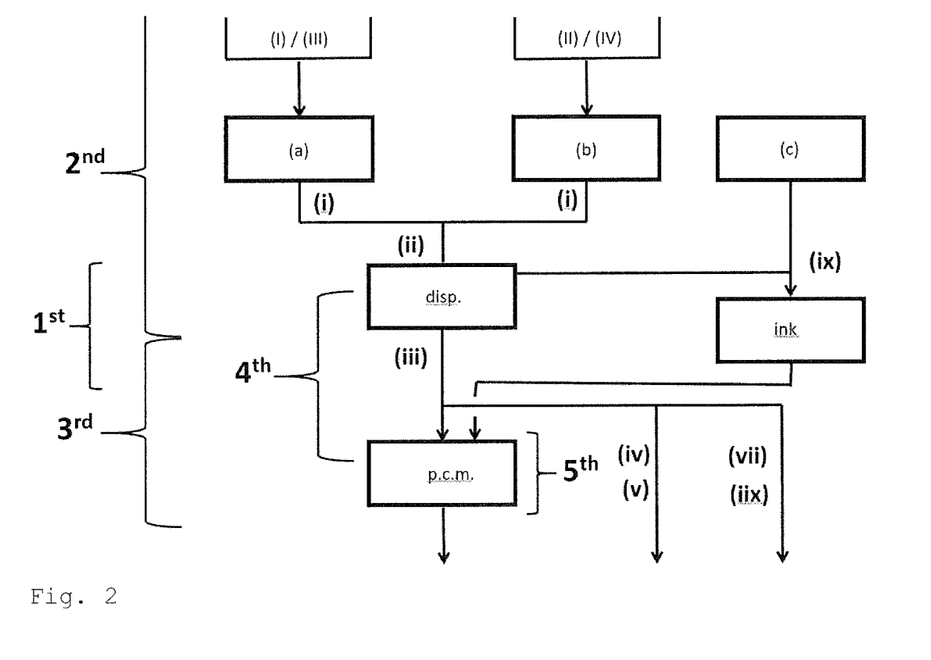
Figure 3:
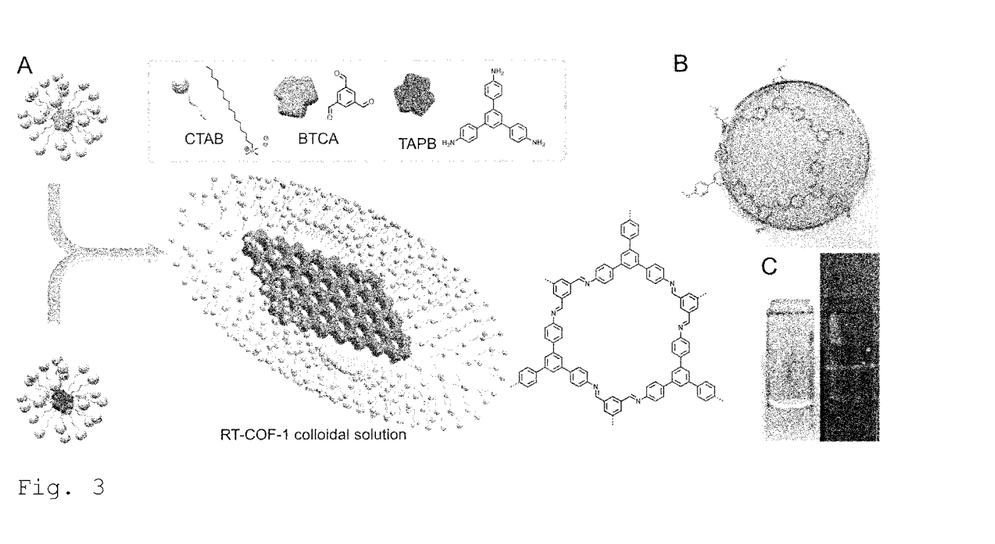
FIG. 3 further outlines the manufacturing according to the $2^{nd}$ aspect of the invention based on a specific example and also provides for analytical results.

The synthetic approach and the results obtained are further summarized in FIG. 3. Confined spaces (micelles) are used to synthetize nanoparticles of the prototypical imine COF, RT-COF-1, in water and at room temperature. RT-COF-1 is obtained from the imine condensation of 1,3,5-tris(4-aminophenyl)benzene (TAPB) with 1,3,5-triformyl-benzene (BTCA). According to the prior art, RT-COF-1 is obtained by reaction of the building blocks in meta-cresol or DMSO in the presence of acetic acid as catalyst yielding an insoluble crystalline powder (A. dela Peña Ruigómez et al. Chemistry, 2015, 21, 10666). However, the present invention demonstrates that it is possible to obtain stable colloidal suspensions of crystalline RT-COF-1 nanoparticles in water by using the mixed micellar system formed by the cationic surfactant mixture hexadecyltrimethylammonium bromide/sodium dodecyl sulfate (CTAB/SDS)

In a third aspect, the invention relates to the use of aqueous PCM dispersions as described herein (first aspect) and to processes using such dispersions. This aspect of the invention shall be explained in further detail below:

MOFs and COFs are PCMs with a well-defined and tunable pore size and pore surface chemistry. Therefore, these materials have potential applications in different fields such as sensing, optical applications, catalysis, absorption, optoelectronics, molecular electronics, biomedicine or drug delivery. However, for biomedical applications (such as drug delivery and water treatment) the success of their implementation is limited because known PCMs cannot be suspended in aqueous solutions and their sizes are in the submicron meter range. Colloidal dispersions of these materials in water and with defined sizes in the nanometer range will launch a new paradigm shift in MOFs and COFs research, and thus, in the number of applications of these materials. In summary, considering the chemical robustness of COFs and MOFs, and the presence of molecular functionality and/or active metal centers in COFs and MOFs' structures, the application of these materials in many applications, including adsorbents for the removal of pollutants from contaminated wastewater and on drug delivery, is of upmost importance and interest.

In one embodiment, the dispersions described herein are used for manufacturing PCMs. The dispersions may be considered as nano-reactors where PCMs are produced. The thus manufactured PCMs may be obtained in various forms, such as bulk material of PCMs or thin films of PCMs. Accordingly, the invention provides for the manufacturing of thin films of PCMs and for the manufacturing bulk material consisting of PCMs.

In one embodiment, the dispersions described herein are used for the treatment of water, particularly for removing dissolved pollutants.

Water scarcity is gradually emerging as a worldwide problem because of accelerating population growth and environmental pollution. Many regions are characterized by increasing irregular and limited water resources, spatially and temporally. Currently, two billion people are living in areas of excess water stress. Without change, demand for water will exceed supply by 40%. For instance, water resources management in general and wastewaters reuse, and valorisation in particular is currently considered as an important worldwide challenge. In this context, the 2030 United Nations Agenda for Sustainable Development Goals targets to improve water quality by reducing pollution, eliminating dumping and minimizing release of hazardous chemicals and materials, halving the proportion of untreated wastewater and substantially increasing recycling and safe reuse globally. The present invention will clearly contribute to the field of water treatment, specifically in the elimination of pollutant and micro-pollutant present in water.

The invention thus provides for a method for the treatment of water, said method comprising the steps of providing a dispersion described herein and contacting said dispersion with untreated water ("step iv") and removing dissolved pollutant to thereby obtain treated water ("step v"). Such pollutants may be selected from heavy metals, organic dyes, active ingredients ("drugs", including a.i. for human or veterinary use and plant protection, VOCs).

In one embodiment, the dispersions described herein are used as a vehicle/nano-carrier, particularly for drug delivery.

The present invention offers a much-needed boost to the health care biotech industry, which is currently facing unprecedented challenges, with many companies operating in cost-cutting mode, while trying to identify ways to increase productivity of their R&D. It is believed that the technology presented herein will have a significant impact on health care biotech as it provides a new synthetic way to rationalize materials and new products with specific function.

Accordingly, the invention provides for a method for manufacturing a pharmaceutical product, said method comprising the steps of providing a dispersion as described herein and contacting said dispersion with an active ingredient ("step vi"). In principle any active ingredient may be used, preferred are Biomolecules (such as proteins and sugars) and small molecules (APIs, such as ibuprofen).

In one embodiment, the dispersions described herein are used as catalyst material in homogeneous catalysis. Until now, MOFs and COF are used in heterogeneous catalysis, the use in homogeneous catalysis will increase the efficiency of the catalytic activity. Accordingly, the invention provides for a homogenous catalytic process, said process comprising the steps of providing a dispersion as described herein; optionally contacting said dispersion with a catalytically active component ("step vii") to thereby obtain a modified dispersion and contacting said dispersion with starting materials of said catalytic process ("step iix").

The use of PCMs in homogeneous catalysis was not yet contemplated and provides an alternative catalytic approach to a broad range of chemical reactions. In principle, any homogeneously catalysed reaction may be subject to such inventive process as described herein. As a consequence, the term "starting material" includes any chemical entity which may be subject to a catalytic reaction.

The PCM itself may have catalytic properties, step (vii) is thus optional. If the reaction at stake requires a further catalytic centre, an additional catalytically active component may be added (step vii). In such embodiment, the catalyst is protected in the structure of the PCM. This enables the use of the catalyst in non-conventional media.

In one embodiment, the dispersions described herein are used for manufacturing an ink. Besides the relevance of obtaining stable aqueous colloidal dispersions of nanosized PCMs, this invention also opens new venues for their processability. Indeed, one of the major limitations for further implementation and optimal performance of PCMs outside of laboratory environments has traditionally arisen from the difficulty in processing them into different shapes and sizes. According to this invention, the possibility to control the aggregation of the colloids by the addition of non-solvent, such as ethanol, enables the generation of a variety of micro- and millimeter sized structures ranging from two-dimensional (2D) freestanding films to three-dimensional (3D) shapes, in addition to a direct printing of the ink. Importantly, PCM structures when processed as described below are identical to the PCMs of the starting material, evidencing that the processing hardly affects the PCM properties. This was shown by PXRD measurements.

Figure 4:
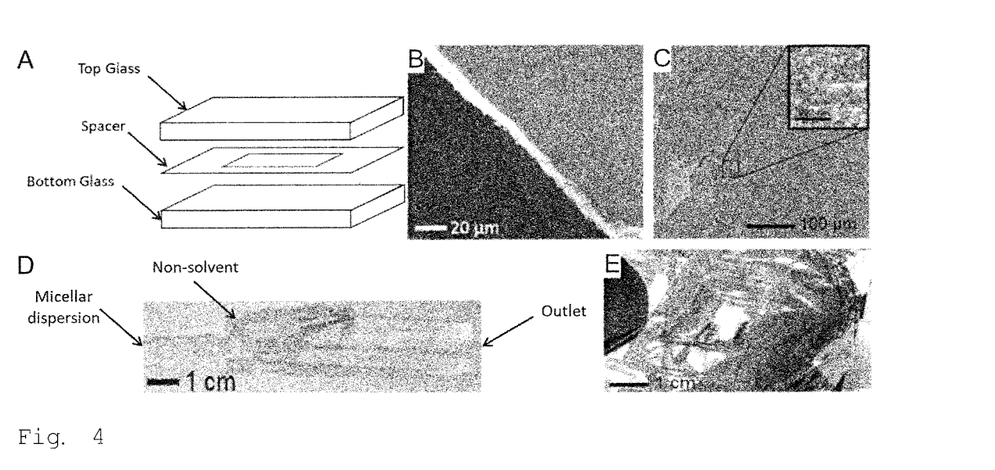
FIG. 4 outlines the processability of RT-COF-1 from its colloidal solution according to this invention.

2D-Structures: As a first step in the fabrication of 2D structures, the water of the RT-COF-1 colloid was solvent exchanged with non-solvent, such as ethanol, thus generating a highly concentrated and viscous dispersion of the porous material in non-solvent ("ink"). Then, by pressing this dispersion between two glass slides separated by a thin spacer and allowing the evaporation of the solvent, RT-COF-1 was processed as a highly uniform freestanding millimeter sized thin film with a thickness of 500±10 nm (FIG. 4, A to C). Further, the production of these 2D structures can also be scaled down to the micrometer range by using a stamp with square patterns instead of a plain glass slide, thus, nicely patterned squares of 500 µm in lateral size are obtained, proving the processability of the RT-COF-1 nanoparticles into various 2D structures. The SEM images at high magnification of the processed RT-COF-1 films and 2D structures show that they are composed of aggregated nanoparticles with size and shape similar to the unprocessed COF thus demonstrating that the processing does not affect to the structure of the nanoparticles.

3D-Structures: Moreover, the potential of the present methods is not limited to the 2D realm, RT-COF-1 3D structures are generated if the same ink used before is fed into a 3D mold with octahedral shapes. In this case, since non-solvent (e.g. ethanol) evaporation results in volume reduction and subsequent collapse of the patterned 3D structures, controlled exchange of the ethanol with liquid $CO_2$ followed by critical point drying was applied for the successful preparation of 3D-patterned RT-COF-1 octahedral.

Direct Printing: Also within the scope of this invention, direct printing of the inks as described herein is encompassed. In this embodiment, the ink (e.g. aqueous RT-COF-1 colloidal solution) is employed to print PCMS (e.g. RT-COF-1 nanoparticles) onto surfaces. In order to achieve this, a concentric two inlet 3D focusing microfluidic device was employed (FIG. 4D). Thus, the colloidal dispersion as described herein (e.g. RT-COF-1 aqueous colloid) was injected through the central inlet, while non-solvent (e.g. ethanol) was pumped from the outer inlet to create a concentric sheath flow around the colloidal COF stream. Due to the controlled diffusion of non-solvent into the colloidal dispersion, the micelles gradually destabilize resulting in the aggregation of RT-COF-1 nanoparticles. This methodology does not only enable a controlled destabilization of the colloid due to the laminar flow but the direct printing of COF structures onto a surface using the outlet tube as a pen. Therefore, we show that this method allows for an effective transformation of the colloid to an ink (FIGS. 4E and 4F).

In a forth aspect the invention relates to methods of manufacturing PCMs as described herein ($1^{st}$ aspect). This aspect of the invention shall be explained in further detail below:

The inventive method provides PCMs as a solid bulk material or in the form of a thin film which is typically located on a support material. Further, the inventive methods allow for the manufacturing of free-standing thin films, having a thickness below 1000 µm, preferably below 500 µm. The inventive method comprises the steps of providing a dispersion as described herein (1st aspect) and isolating said porous crystalline material ("step iii").

Process step (iii): Separating a dispersion into its components, i.e. dispersed solid material and continuous phase, is entirely conventional—but not yet applied to the dispersions as described herein. Depending on the intended use and the overall process, various isolation steps may be applied, either alone or in combination. These steps include solvent precipitation (iii-a), pH-adjustment (iii-b), centrifugation (iii-c), osmosis (iii-d), coating and printing (iii-e) and combinations thereof. Steps (iii-a) to (iii-d) are particularly suited to obtain bulk material while step (iii-e) is particularly suited to obtain thin films.

In a fifth aspect the invention relates to new porous crystalline materials, specifically in the form of MOFs and COFs. This aspect of the invention shall be explained in further detail below:

As discussed, the inventive manufacturing method allows replacing the existing method for manufacturing known PCMs. Further, PCMs with here to unknown properties are obtainable. Accordingly, the invention provides for an isolated porous crystalline material (including bulk material and thin films optionally on a support), obtainable by or obtained by a method as described herein, forth aspect. Particularly, the invention provides for isolated PCMs, where such method involves only process steps performed at room temperature and atmospheric pressure.

In one embodiment, the invention provides for COFs from the class of imines with particle size below 16 nm. Such COFs may be present either as isolated bulk material, as a thin film on a support, or in the form of a suspension.

In one embodiment, the invention provides for MOFs from the class of Catechols with particle size below 20 nm. Such MOFs may be present either as isolated bulk material, as a thin film on a support, or in the form of a suspension.

In one embodiment, the invention provides for TCPP-Cu MOF free of metal in the porphyrin core. Such MOFs may be present either as isolated bulk material, as a thin film on a support, or in the form of a suspension In one embodiment, the invention provides for ZIF-8 of square nanoparticles of 30 nm as a nano-dispersion.

In one embodiment, the invention provides for MIL 100(Fe) with particle size below 16 nm. Such MOFs may be present either as isolated bulk material, as a thin film on a support, or in the form of a suspension.

The inventive new PCMs have numerous commercial applications, e.g. as discussed above, 3$^{rd}$ aspect of the invention.

To further illustrate the invention, the following examples are provided. These examples are provided with no intend to limit the scope of the invention.

General Synthesis:

In a common experiment, we separately dissolved in a water-micellar media two or more building blocks capable to react giving a porous crystalline material. After that, we mixed at room temperature the colloidal solution of the building blocks, inducing the reaction between them inside the micelles, and finally obtaining a stable colloidal suspension of the porous crystalline material. Next, the colloidal suspension was mixed with ethanol in order to remove the surfactant, obtaining a solid nanoparticle suspension of the material, which can be isolated by centrifugation or filtration.

Materials and Methods:

All chemicals and solvents were obtained from commercial sources and employed without further purification. 1,3,5-tris(4'-aminophenyl)benzene was prepared using previously published procedures (Chem. Eur. J., 2015, 21, 10666).

Attenuated Total Reflection Fourier Transform Infrared Spectroscopy (ATR-FT-IR) was recorded in a Perkin Elmer Spectrum 100 with a PIKE Technologies MIRacle Single Reflection Horizontal ATR accessory with a spectral range of 4000-650 cm$^{-1}$.

Thermogravimetric analyses of samples were run on a Thermobalance TGA Q-500 thermal gravimetric analyzer with samples held in a platinum pan under nitrogen atmosphere. A 10 K min$^{-1}$ ramp rate was used.

High Resolution Transmission Electron Microscopy (HR-TEM) images were obtained in a JEOL-JEM GRAND ARM 300cF microscope equipped with a Cs Corrector (ETA-JEOL). A precise measurement of the aberrations and an optimized correction has been done using the corrector control software JEOL COSMO. The accelerating voltage was set to 60 kV in order to minimize the sample damage. The HRTEM images were acquired by a slow-scan CCD camera (4096×4096 pixels, Gatan OneView Camera). Samples were prepared by casting a drop of the solution after 72 h of reaction on TEM grids (200 mesh, copper-based holey carbon film, Electron Microscopy Sciences) and rinsing the grid with 50 µL of water and 100 µL of ethanol to remove the excess surfactant.

Field Emission Scanning Electron Microscopy (FESEM) studies were performed on a Zeiss ULTRA 55 microscope. Samples were previously coated with chromium in a sputter Quorum Q150T-S.

Powder X-ray diffraction patterns were collected with a Bruker D8 Advance X-ray diffractometer (Cu-Kα radiation; X=1.5418 Å) equipped with a Lynxeye detector. Samples were mounted on a flat sample plate. Patterns were collected in the 3.5°<2θ<35° range with a step size of 0.016° and exposure time of 0.8 s/step.

Conventional $N_2$ adsorption isotherms were measured using a Micromeritics Tristar II volumetric instrument under continuous adsorption conditions. Brunauer-Emmet-Teller (BET) analysis was carried out to determine the total specific surface areas for the $N_2$ isotherms at 77 K. Prior to measurement, powdered samples were heated at 353 K for 12 h and outgassed to 10$^{-6}$ Torr.

Dynamic Light Scattering (DLS) studies were carried out using a Cordouan Technologies Vasco 1 particle size analyser by directly measuring the solution prior to adding ammonia.

Overview:

The following porous crystalline materials were synthesized according to the present invention
example 1. COF-1
example 2. COF-2
example 3. Cat-MOF,
example 4. Porphyrin-MOF,
example 5. ZIF-8,
example 6. Mil 100 (Fe)

Conclusions:

The examples provided herein clearly show that a broad range of MOFs and COFs are available using the inventive manufacturing method.

The examples provided herein clearly show that a broad range of surfactants/amount of surfactants is applicable to the inventive manufacturing method. The MOFs/COFs presented herein show comparable properties with MOFs/COFs obtained by standard methods. Accordingly, the materials obtained are useful in all application for such MOFs/COFs.

Example 1, COF-1

8.1 mg (50 µmol) of 1,3,5-benzenetricarboxaldehyde were dissolved in 70 µL of DMSO and added to 20 mL of a 0.1 M solution of cetyltrimethylammonium bromide in water under ultrasonication to obtain a clear colorless solution. Separately, 17.6 mg (50 µmol) of 1,3,5-tris(4'-aminophenyl)benzene were dissolved in 60 µL of DMSO and added to 20 mL of a 0.1 M solution of cetyltrimethylammonium bromide in water under ultrasonication to obtain a clear colorless solution. Next, 0.6 mL of a 0.1 M solution of sodium dodecyl sulfate in water were added to each of the aqueous solutions. Finally, the solutions were mixed and 2 mL of acetic acid were added. The resulting solution slowly turned orange. After 72 h at 28° C., 1 mL of a 28% w/w aq. ammonia solution was added and yellow turbidity appeared. Next, 20 mL of ethanol were added and the dispersion was centrifuged at 2000 rcf for 5 min. A yellow solid settled and was solvent exchanged 4 times with 20 mL of ethanol and 4 times with 20 mL of acetone, recovering the solid each time by centrifugation. Finally, it was activated by supercritical $CO_2$ exchange. 16.7 mg are obtained (72% yield).

PXRD (2θ): 5.8°, 10.4°, 11.3°, 15.8°, 26.0; SEM: nanoparticles with 16 nm of diameter. BET surface area (N2, 77K): 684 m$^2$ g$^{-1}$;

Different ratios of cetyltrimethylammonium bromide and sodium dodecyl sulfate were used for the synthesis of COF-1 (Table 1). The different ratio affects to the size of particles going from nanometric- to micro-scale (size measured with dynamic light scattering.

TABLE 1

| CTAB:SDS | Diameter (nm) |
|---|---|
| 100:0 | 53 |
| 97:3 | 34 |
| 85:15 | 41 |
| 80:20 | 228 |
| 75:25 | 226 |
| 70:30 | 254 |
| 60:40 | 294 |

TABLE 1-continued

| CTAB:SDS | Diameter (nm) |
|---|---|
| 50:50 | 630 |
| 25:75 | Microscale |
| 3:97 | 260 |
| 0:100 | 299 |

The concentration of the cetyltrimethylammonium bromide can be modified from 0.1M to 0.001 M for synthesizing the COF-1 with a slight effect in the size of nanoparticles (table 2)

TABLE 2

| CTAB Concentration (M) | Diameter (nm) |
|---|---|
| 0.1 | 53 |
| 0.01 | 43 |
| 0.001 | 76 |

Other surfactants were used for the synthesis of COF-1 (table 3). In all of cases, the particle size was in the microscale. Only for the use of benzalkoniumn chloride was obtained a particle size in the range of the nanometers.

TABLE 3

| Surfactant | Characteristics | Diameter (nm) |
|---|---|---|
| Dodecyltrimethyl-ammonium bromide | Cationic C12 | Microscale |
| Benzalkonium chloride | Cationic, C8 to C18 plus phenyl ring | 85 |
| Sodium dodecyl-benzenesulfonate | Anionic, C12 plus phenyl ring | Microscale |
| Sodium octadecylsulfate | Anionic, C18 | Microscale |
| Sodium stearate | Anionic, C18, carboxylic | Microscale |

Example 2, COF-2

8.1 mg (50 µmol) of 1,3,5-benzenetricarboxaldehyde were dissolved in 70 µL of DMSO and added to 20 mL of a 0.1 M solution of cetyltrimethylammonium bromide in water under ultrasonication to obtain a clear colorless solution. Separately, 17.7 mg (50 µmol) of 2,4,6-Tris(4-aminophenyl)-1,3,5-triazine were dissolved in 60 µL of DMSO and added to 20 mL of a 0.1 M solution of cetyltrimethylammonium bromide in water under ultrasonication with ca. 0.1 mL of acetic acid to obtain a clear colorless solution. Next, 0.6 mL of a 0.1 M solution of sodium dodecyl sulfate in water were added to each of the aqueous solutions. Finally, the solutions were mixed and 2 mL of acetic acid were added. The resulting solution slowly turned orange. After 72 h at 28° C., 1 mL of a 28% w/w aqueous ammonia solution was added and yellow turbidity appeared. Next, 25 mL of ethanol were added and the dispersion was centrifuged at 2000 rcf for 5 minutes. A yellow solid settled and was solvent exchanged 4 times with 20 mL of ethanol recovering the solid each time by centrifugation. Finally, it was activated by supercritical $CO_2$ exchange.

PXRD (2θ): 6°, 10.5°, 11.5°, 15.6°, 26.0. SEM: nanoparticles with 16 nm of diameter Example 3, Cat-MOF 25 mg (77.1 µmol) of 2,3,6,7,10,11-triphenylenehexol were suspended in 50 mL of CTAB 0.1 M in water, giving a brown dispersion. Separately 31 mg (88.1 µmol) of copper (II) acetate were dissolved in 0.1 mL of CTAB 0.1 M in water. Finally, both solutions were mixed. The resulting solution quickly turned clear and black. After 48 hours at 28° C., 25 mL of ethanol were added and the obtained black dispersion was centrifuged at 2000 rcf for 5 minutes. A black solid settled and was solvent exchanged 4 times with 20 mL of ethanol recovering the solid each time by centrifugation. Finally, it was activated by supercritical $CO_2$ exchange.

PXRD (2θ): 4.5°, 9.6°, 12.7°, 27.9°; SEM: nanoparticles with 16 nm of diameter. BET surface area ($N_2$, 77K): 235 $m^2 g^{-1}$;

Example 4, Porphyrin-MOF 25 mg (30 µmol) of tetrakis(4-carboxyphenyl)porphyrin were dissolved in 70 µL of DMSO and added to 50 mL of a 0.1 M solution of cetyltrimethylammonium bromide in water under ultrasonication to obtain dark orange suspension. Separately 16 mg (170.7 µmol) of copper (II) acetate were dissolved in 0.1 mL of CTAB 0.1 M in water. Finally, both solutions were mixed. The resulting solution quickly turned clear and dark-red. After 48 hours at 28° C., 25 ml of ethanol were added and the obtained red dispersion was centrifuged at 2000 rcf for 5 minutes. A red solid settled and was solvent exchanged 4 times with 20 mL of ethanol recovering the solid each time by centrifugation. Finally, it was activated by heating at 70° C. and 300 mbar for 48 hours.

PXRD (2θ): 5.5°, 7.7°, 10.9°, 12.1°, 16.2°, 19.7°, 21.6°, 23.0°, 27.0°, 30.7°, 34.9°; SEM: nanometric flakes.

Example 5, ZIF-8

100 mg (1.21 mmol) of 2-methylimidazole were dissolved in 100 mL of a 0.1 M solution of cetyltrimethylammonium bromide in water obtaining a clear colorless solution. Next, 3.75 mL of a 0.1 M solution of sodium dodecyl sulfate in water were added to the aqueous solutions. Separately 133.7 mg (0.61 mmol) of zinc (II) acetate dihydrate were dissolved in 2 mL of CTAB 0.1 M in water. Finally, the solutions were mixed and 2 mL of a 28% w/w aqueous ammonia solution were added. The resulting solution slowly turned white. After 48 h at 28° C., the solution was lyophilized. Next, 2 mL of ethanol were added and the dispersion was filtered and washed 3 times with 2 mL of ethanol, obtaining a white solid. Finally, the solid was activated heating at 70° C. at 300 mbar for 2 days.

PXRD (2θ): 7.7°, 10.8°, 13.1°, 15.0°, 16.8°, 18.3°, 19.9°, 21.7°, 22.4°, 24.8°, 25.9°, 27.1°, 29.1°, 30.0°, 30.9°, 31.8°, 32.7°, 34.5°, 35.3°, 36.9°, 37.7°, 39.2°; SEM: nano-squares with 30 nm side.

Example 6, Mil 100 (Fe)

50 mg (0.24 mmol) of benzene-1,3,5-tricarboxylic acid were dissolved in 70 µL of DMSO and added into 100 mL of a 0.1 M solution of cetyltrimethylammonium bromide in water under ultrasonication obtaining a clear colorless solution. Next, 3.75 mL of a 0.1 M solution of sodium dodecyl sulfate in water and 70.7 mg (0.72 mmol) of potassium acetate were added to the aqueous solution. Separately 62.1 mg (0.36 mmol) of iron (II) acetate were dissolved in 2 mL of CTAB 0.1 M in water. Finally, the solutions were mixed. The resulting solution slowly turned orange. After 7 days at 28° C., 50 mL of ethanol were added and the obtained was filtered. The precipitate was washed 3 times with 2 mL of ethanol, obtaining a pale orange powder. Finally, the solid was activated heating at 70° C. at 300 mbar for 2 days.

PXRD (2θ): 3.5°, 4.0°, 4.8°, 6.2°, 10.2°, 11.0°, 12.5°.

SEM: nano-flakes with a lot polydispersity.

Example 7, for Comparison

The experiment described in Yichang Pan et al (cited above) is repeated.

A slightly turbid white suspension with 80 nm particles (determined DLS) is formed. It is stable without any size change only for one week.

This indicates that no colloidal dispersion is obtained when following the Protocol of Yichang Pan et al.

The invention claimed is:

1. A colloidal dispersion comprising
   a continuous phase; and
   micelles dispersed therein,
   characterized in that:
   said continuous phase comprising water and optionally one or more additives,
   said micelles comprising surfactants and porous crystalline materials (PCMs) selected from the group consisting of metal organic frameworks (MOFs), and covalent organic frameworks (COFs); wherein surfactants are:
   (a) surfactant and a co-surfactant, or
   (b) surfactant and co-surfactants;
   said micelles are between 10-1000 nm according to dynamic light scattering (DLS) measurements;
   said micelles are monodisperse in size; wherein monodisperse relates to the micelles having a narrow size distribution with a polydispersity index (PDI) between 0 and 0.7 determined according to dynamic light scattering (DLS) measurements;
   the sum of the combined concentration of said surfactants (a) or (b) in said dispersion is above the critical micellar concentration (CMC); wherein the ratio of PCMs: surfactants is in the range 1:100-2:1 (w/w).

2. The dispersion of claim 1 characterized in that
   said dispersion having a micellar size between 15-200 nm; and/or
   said continuous phase comprises at least 90 wt % water; and/or
   said surfactants (a) or (b) are selected from the group consisting of cationic surfactants, anionic surfactants and non-ionic surfactants; and/or
   said one or more additives, if present, are selected from the group consisting of pH modifiers, ionic strength modifiers, viscosity modifiers, and catalysts; and/or
   said micelles are monodisperse in size; wherein monodisperse relates to the micelles having a narrow size distribution with a polydispersity index (PDI) between 0.05 and 0.5 determined according to dynamic light scattering (DLS) measurements; and/or
   wherein the colloidal dispersion comprises
   0.01-4 wt % of PCMs,
   about 80-99 wt % of water,
   about 0.01-4 wt % of surfactant,
   about 0.01-4 wt % of co-surfactant; and
   about 0.001-10 wt % of additive.

3. The colloidal dispersion according to claim 1; wherein the surfactants are a combination of cetyl trimethylammonium bromide (CTAB) and sodium dodecyl sulfate (SDS).

4. The colloidal dispersion according to claim 1; wherein the porous crystalline materials (PCMs) are covalent organic frameworks (COFs).

5. The colloidal dispersion according to claim 1; wherein the metal organic frameworks (MOFs) are selected from the group consisting of ZIF-7, ZIF-8, ZIF-20, ZIF-21, ZIF-22, ZIF-23, ZIF-67, ZIF-69, ZIF-90, SIM-1, MIL-47, MIL-53, MOF-5, MIL-96, MIL-89, MIL-101, and HKUST-1; and/or
   wherein the covalent organic frameworks (COFs) are selected from the group consisting of TpPa-1, Tp-Azo COF, CTV-COF-1, TpBDH COF, COF-LZU-8, TpPa-Py, Py-An COF 2, DhaTph COF, CS-COF, PI-COF-2, PI-COF-3, TFPT-COF, ACOF-1, COF-JLU2, N3-COFs and Py-Azine COF.

6. An ink comprising the colloidal dispersion according to claim 1, wherein the continuous phase further comprises one or more non-solvents;
   wherein the one or more non-solvents are is selected from the group of organic
   solvents miscible with water and having a dielectric constant in the range of 2-50.

7. The ink according to claim 6, wherein the one or more non-solvents are selected from the group consisting of $C_1$-$C_4$ alcohols, $C_1$-$C_4$ aldehydes, $C_3$-$C_5$ ketones, $C_1$-$C_6$ carboxylic acids, $C_1$-$C_6$ carboxylic acid $C_1$-$C_2$ esters, $C_1$-$C_2$ nitriles, and tetrahydrofuran (THF).

* * * * *